United States Patent Office 3,085,908
Patented Apr. 16, 1963

3,085,908
AMINOSILICON TREATED METALS AND METHODS OF TREATMENT AND PRODUCTION
Edward L. Morehouse and Arthur N. Pines, Snyder, N.Y., assignors to Union Carbide Corporation, a corporation of New York
No Drawing. Filed May 26, 1959, Ser. No. 815,794
36 Claims. (Cl. 117—127)

This invention relates to a process for treating metal surfaces to improve their resistance to corrosion and to high temperature oxidation, and particularly to a process employing aminoalkyl silicon compounds to provide protective coatings for metals. This invention also relates to articles having metal surfaces coated with aminoalkyl silicon materials. It has been found that by treating or coating a metal, as for example copper, with an aminoalkyl silicon compound having the amino group attached to silicon through at least three carbon atoms, as for example gamma-aminopropyltriethoxysilane, the coated metal becomes resistant to corrosion under a wide variety of conditions.

The use of organic amines, particularly the high molecular weight organic amines, as corrosion inhibitors is known. In most instances they are dissolved in a suitable solvent and are applied by coating or spraying on metal surfaces. Among the organic amines employed for this purpose are hexadecylamine, octadecylamine, N-octadecylpropylene diamine-1,3, as well as their fatty acid derivatives. It is also known that certain paints have been suggested for this purpose. However, the use of organic amines, paints, and the like as corrosion inhibitors for metals has left much to be desired. By way of illustration, while the above compounds furnish some degree of protection against corrosion to certain few metals under atmospheric conditions, they have been ineffective as corrosion inhibitors at elevated temperatures for any metal. For example, the ferrous metals when coated with these compounds, such as N-octadecylpropylene diamine-1,3, are resistant to corrosion under atmospheric conditions. However, when the coated metals are subjected to even brief contact at elevated temperatures, the corrosion inhibiting properties of the organic amine are lost. These organic amines are thermally unstable at elevated temperatures and decompose. Also, it is to be emphasized that these amines are not effective with other metals, as for example copper and its alloys, since these amines promote corrosion thereof.

Accordingly, it is an object of this invention to provide a process for improving the corrosion resistant properties of metals, particularly those metals which are readily oxidized, such as copper, and which as far as it is known are not effectively protected by known organic corrosion inhibitors.

We have found that metals having a coating of an aminoalkyl silicon compound having the amino group attached to silicon through at least three carbon atoms, applied either as a monomer or polymer, have improved resistance to corrosion. For example, we have found that most metals (including copper) can be made resistant to oxidation at ambient temperature and at temperatures thereabove and therebelow by coating such metals with such an aminoalkyl silicon compound. In addition we have found that such coated metals are resistant to corrosion caused by contact with vapors or liquids which are either acidic, neutral, or basic in nature.

These coatings are normally transparent and do not have an adverse effect on the appearance of the metal. They leave no oily residual film. In these ways they differ markedly from the paints and coatings heretofore used as corrosion protectants.

Suitable for use in our process are the aminoalkylalkoxysilanes and the aminalkylpolysiloxanes, including copolymeric materials which contain both aminoalkylsiloxane units and hydrocarbylsiloxane units. Each of these materials contains the group:

wherein R is a divalent saturated aliphatic or saturated or unsaturated cyclic hydrocarbon radical having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH$_2$)$_a$Si≡], and wherein at least one free bond of silicon is attached to a group from the class of alkyl and silicon through Si—O bonds and the remaining free bonds of silicon are attached to hydrocarbyl. Hydrocarbyl is intended to mean a monovalent group composed of carbon and hydrogen. Typical of the aminoalkylalkoxysilanes which may be employed for our coating are those compounds represented by the structural formula:

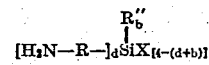

wherein R'' represents an alkyl group such as methyl, ethyl, propyl, and butyl, and the like, or an aryl group such as phenyl, naphthyl and tolyl and the like, X represents an alkoxy group such as methoxy, ethoxy, and propoxy groups and the like, R is a divalent radical as described above, and preferably having a carbon chain of from 3 to 4 carbons, (b) is an integer having a value of from 0 to 2 and preferably a value of from 0 to 1, (d) is an integer having a value of from 1 to 2, and the sum of (d+b) is not greater than 3. Illustrative of such aminoalkylalkoxysilanes are gamma-aminopropyltriethoxysilane, gamma-aminopropyltripropoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylmethyldiethoxysilane, delta - aminobutylethyldiethoxysilane, delta - aminobutylphenyldiethoxysilane, gamma-aminobutyltriethoxysilane, gamma - aminobutylmethyldiethoxysilane, and the like. The aminoalkylalkoxysilanes are disclosed and claimed as new compositions of matter in copending U.S. applications Serial Nos. 483,421 and 615,466, filed January 21, 1955, now Pat. No. 2,832,754, and October 12, 1956, now Pat. No. 2,930,809, respectively. Processes for producing these compounds are also disclosed and claimed in said copending applications.

Typical of the aminoalkylpolysiloxanes which may be used for our coating are those polysiloxanes which contain the structural unit:

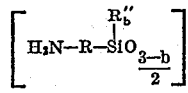

wherein R, R'', and (b) have the same values described above. Such polysiloxanes are prepared by the hydrolysis and condensation of those aminoalkylalkoxysilanes described above or by the cohydrolysis and cocondensation of such aminoalkylalkoxysilanes with other hydrolyzable silanes and can include aminoalkylpolysiloxanes of the trifunctional variety (i.e. where $b=0$), aminoalkylalkylpolysiloxanes and aminoalkylarylpolysiloxanes of the difunctional variety which include cyclic or linear polysiloxanes (i.e. where $b=1$) and linear aminoalkyldialkyldisiloxanes, aminoalkyldiaryldisiloxanes and aminoalkylalkylaryldisiloxanes of the monofunctional variety (i.e. where $b=2$) as well as the mixture of compounds produced by the cohydrolysis of difunctional, trifunctional and monofunctional aminoalkylsilanes.

Suitable aminoalkylpolysiloxanes of the trifunctional variety can be more specifically depicted as containing the structural unit:

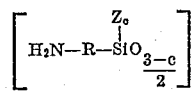

wherein R has a value previously described, Z represents an hydroxyl and/or alkoxy group, and ($c$) has an average value of from 0 to 1 and can be as high as 2 but preferably from 0.1 to 1. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes in which Z represents predominantly silicon-bonded alkoxy groups can be prepared by the partial hydrolysis and complete condensation of the same starting silane. On the other hand, aminoalkylpolysiloxanes in which Z represents predominantly silicon-bonded hydroxyl groups can be prepared by the essentially complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable aminoalkylpolysiloxanes of the difunctional variety which include cyclic and linear polysiloxanes can be more specifically depicted by the structural formula:

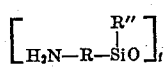

wherein R, and R'' have the values previously described and ($f$) is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyldialkoxysilanes or aminoalkylaryldialkoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use in our coating process are the cyclic tetramer of gamma-aminopropylmethylsiloxane, the cyclic tetramer of delta-aminobutylphenylsiloxane and the like. Illustrative of linear aminoalkylpolysiloxanes suitable for use in our coating process are gamma-aminopropylmethylpolysiloxane, gamma - aminopropylethylpolysiloxane, delta - aminobutylmethylpolysiloxane, gamma-aminobutylmethylsiloxane, and the like.

Included among the linear aminoalkylpolysiloxanes which may be employed in our process are the alkyl, alkoxy and hydroxyl end-blocked polysiloxanes which contain from 1 to 3 of such groups bonded to the terminal silicon atoms of the molecules comprising the polymeric chains. Thus we can also employ as our starting aminoalkyl silicon compound such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkylpolysiloxanes and aminoalkylarylpolysiloxanes useful in our process can be prepared by the equilibration of cyclic aminoalkylsiloxanes with silicon compounds containing predominantly silicon-bonded alkoxy groups, or by the cohydrolysis and condensation of trialkylalkoxysilanes with aminoalkylalkyldiethoxysilanes or aminoalkylaryldiethoxysilanes. Hydroxyl endblocked linear polysiloxanes can also be prepared by heating linear or cyclic aminoalkylpolysiloxanes with water.

Typical copolymeric aminoalkylpolysiloxanes which can be employed in our process can be depicted as containing the structural unit:

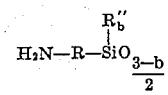

wherein R, R'', and ($b$) have the values described above—the group R'' need not be the same in the siloxane unit and/or in the siloxane molecule—and at least one other siloxane unit, which unit can be a different species of the above unit or it may be a unit represented structurally as follows:

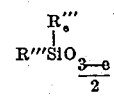

wherein R''' represents an alkyl group, such as methyl, ethyl, propyl, and butyl, and the like, or an aryl group such as phenyl, naphthyl, and tolyl, and the like, or an olefinic group, such as vinyl and cyclohexenyl and the like, and ($e$) is an integer having a value of from 0 to 2. Likewise R''' need not be the same in the siloxane unit and/or in the siloxane molecule. The copolymeric material described herein include copolymers having two or more different units. The copolymers suitable for use in our process can contain various combined siloxane units such as trifunctional aminoalkylsiloxane units (where $b=0$) with trifunctional alkyl-, aryl-, olefinic- or mixed alkyl-, olefinic- and arylsiloxane units (where $e=0$) or with difunctional alkyl-, aryl-, olefinic, or mixed alkyl, olefinic- and arylsiloxane units (where $e=1$). There copolymers can also contain various combined siloxane units, difunctional aminoalkylsiloxane units (where $b=1$) with trifunctional alkyl-, aryl-, olefinic- or mixed alkyl-, olefinic- and arylsiloxane units (where $e=0$) or with difunctional alkyl-, aryl-, olefinic-, and arylsiloxane units (where $e=1$).

Those copolymers which contain trifunctional aminoalkylsiloxane units and other siloxane units are preferably prepared by the cohydrolysis and co-condensation of the corresponding alkoxysilane starting materials. Such copolymers can contain silicon-bonded alkoxy and/or hydroxyl groups or they can comprise essentially completely condensed materials. The linear and cyclic copolymeric siloxanes can be prepared by the method just described or by the separate hydrolysis and condensation of an aminoalkylalkyldialkoxysilane or aminoalkylaryldialkoxysilane and the dialkyldialkoxysilane, diolefinicdialkoxysilane, alkylaryldialkoxysilane, mono-alkyl-mono-olefinicdialkoxysilane, mono-arylmono-olefinic-dialkoxysilane, or diaryldialkoxysilane to cyclic aminoalkylsiloxanes and cyclic dialkylsiloxanes, alkylarylsiloxanes, diolefinicsiloxanes, mono - alkyl-mono - olefinicsiloxanes, mono-aryl-mono-olefinicsiloxanes or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

While the primary aminoalkyl silicon compounds have been described in detail and are preferred in the treatment of metals to form a protective coating thereon, the corresponding secondary and tertiary aminoalkyl silicon compounds, i.e., those in which one or both of the hydrogen atoms bonded to nitrogen of the generically and specifically depicted primary aminoalkyl silicon compounds is replaced by a hydrocarbon, cyanoalkyl or aminoalkyl group, can be employed, as hereinbefore disclosed, with good results.

Secondary and/or tertiary aminoalkyl silicon compounds containing the unit:

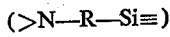

in which the nitrogen atom thereof is bonded to an aminoalkyl or cyanoalkyl group are known as N-aminoalkyl-aminoalkyl and N-cyanoalkyl-aminoalkyl silicon compounds and can be employed in their monomeric form as, for example, a substituted alkoxysilane, or in their polymeric form as well as in the form of a copolymer containing hydrocarbon-substituted siloxane units. As is obvious, such N-aminoalkyl- and N-cyanoalkyl-substituted aminoalkyl silicon compounds when in their polymeric or copolymeric form comprise, for example, oils or resins of the type described above.

The aminoalkyl substituents, which are bonded to the nitrogen atom of aminoalkyl silicon compounds to form products useful in the present invention, contain at least one nitrogen atom which is either primary, secondary or tertiary, and include such groups as beta-aminoethyl, gamma-aminopropyl, gamma-aminoisobutyl, omega-aminohexyl, N-gamma-aminopropyl-gamma-aminopropyl and the like. Typical of such N-aminoalkyl-aminoalkyl silicon compounds are:

N-gamma-aminopropyl-gamma-aminopropylmethyldiethoxysilane,
N-beta-aminoethyl-gamma-aminopropyltrimethoxysilane,
N-beta-aminoethyl-gamma-aminoisobutyltriethoxysilane,
N-gamma-aminopropyl-delta-aminobutylmethyldiethoxysilane and the like as well as the polymers prepared by the hydrolysis and condensation thereof either alone or with other hydrolyzable silanes.

N-aminoalkyl-aminoalkyl silicon compounds are prepared by the reaction of diamines such as ethylene or propylene diamine with chloroalkyl silicon compounds.

The cyanoalkyl substituents which are bonded to the nitrogen atom of aminoalkyl silicon compounds to form products useful in the present invention contain at least one cyano grouping and include such groups as beta-cyano-ethyl, gamma-cyanopropyl, delta-cyanobutyl and the like. Typical of such N-cyanoalkyl-aminoalkyl silicon compounds are:

N-beta-cyanoethyl-gamma-aminopropyltriethoxysilane,
N - gamma-cyanopropyl-gamma-aminosiobutylmethyldiethoxysilane,
N-delta-cyanobutyl-delta-aminobutyltriethoxysilane and the like, as well as the polymers prepared by the hydrolysis and condensation thereof either alone or with other hydrolyzable silanes.

N-cyanoalkyl-aminoalkyl silicon compounds are prepared by the reaction of an aminoalkyl silicon compound with an unsaturated nitrile in the presence of a catalyst.

The metals whose resistance to corrosion can be improved by treating with the above listed aminoalkyl silicon compounds are those metals in the electromotive series which lay below and include magnesium. Alloys of these metals similarly have their corrosion resistance improved by this treatment. The metals and alloys tested include aluminum, brass, bronze, copper, chromium, iron, magnesium, nickel, lead, silver, silverplate, sterling silver, ternplate (tin plate), tin, beryllium bronze and zinc. Excellent corrosion protection was provided by the coatings for all metals. In the instance of nickel, the metal normally has such outstanding protection to the types of corrosion studied in our tests that appreciable improvements were not detected in our tests.

By the present invention, the corrosion resistance of such metals is improved by applying a continuous, thin film of the aminosilicon compound over the surface of the metal and curing the film to form a bonded coating on the surface of the metal. The method by which an aminoalkyl silicon compound is applied to a metal is not critical and any method can be employed that results in the deposition of a continuous film; coatings may be applied employing solvent solution, dispersion in liquid systems, or by using undiluted aminoalkyl silicon materials. Coatings have also been made by spray application from aerosol bombs. The preferred method is applying coating from aqueous solutions, where there is solubility, and from organic solvent solutions such as alcohol and ether solvent systems. For example, solvents which can be used include methanol, ethanol, propanol, isopropanol, butanol, 2-ethyl-hexanol, monomethylether of ethylene glycol, methylene chloride, trichlorethylene, mixed solvent systems such as toluene-monomethylether of ethylene glycol, alcohols and ethers, such as diisopropylether and alcohols and freon-type propellants such as perchloroperfluoromethanes and ethanes.

The systems used for coating can contain varying amounts of the aminoalkyl silicon compound. The amount of the aminoalkyl silicon compound present in a system is not critical and can vary over a wide range. We have employed with good results systems containing from 0.05 percent up to 10 percent by weight. We can employ systems containing greater amounts of the aminoalkyl silicon compound. The concentration employed is largely a matter of cost and convenience.

After dipping or spraying of the aminoalkyl silicon compound on the metal, the coating is cured by heating to temperatures of from about 125° to 600° F. and above or simply by allowing the coated metal to stand at ambient temperature. With certain metals, as for example, copper, it is preferable that the coating be cured by the use of elevated temperatures. By curing of the coating, as used herein, is meant the fixing or bonding of the coating to the surface treated. It appears that a chemical bond or bonds are established by a reaction between the aminoalkyl silicon compound and the metal surface. Although we do not wish to be bound by any one theory, it appears that the bond is constituted either by complexing or chelating through the amine with the metal surface or by bonding to the metal through the carbonfunctional side chain attached directly to the silicon together with a bonding through Si—O— metal linkages.

The thickness of the film applied is not narrowly critical and may vary from very small thicknesses to relatively large ones such as those in excess of one inch. Film thicknesses ranging from 0.01 to 0.10 mil are preferred although from an economic point of view, small film thickness, as small as 0.005 mil, can be employed. The thickness of the coating may be regulated by the application; i.e. the concentration of the solvent solution and the number of applications can be varied to regulate thickness. Even relatively thick films can be obtained by multiple application from dilute solutions. Being able to provide such surface protection to metals by the use of extremely thin film is an important aspect of this invention and a distinct advance in the art of protective coatings for metals.

The improved properties of our coated materials were found by the following tests. In all tests coated metal strips were used as experimental specimens. These strips were cleaned by scouring with an alkaline cleanser, flushed with water, and dried. Aminoalkyl silicon compounds were applied from alcoholic solution and cured. In general coating thickness for the following tests ranged from 0.03 to 0.05 mil.

(1) *Resistance to oxidation at ambient temperatures.*—Both coated and uncoated metal strips were exposed to laboratory and outside industrial atmosphere. Periodic comparative observation of the treated and untreated strips were made and the degree of rusting, pitting, and/or discoloration was recorded. In addition, similar observations were made on the following aminoalkyl silicon treated metal surfaces: copper plated carbon electrodes, silver tableware, chromium bumpers for cars, firearms, and bronze railings. In these instances it was not convenient to heat cure at elevated temperatures the aminoalkyl silicon compound to the metal surface.

(2) *Resistance to high temperature oxidation.*—Copper and brass strips were placed in the 250–275° C. air circulating oven. The effectiveness of the aminoalkyl silicon treatment was evaluated by visual observation of the resistance of the metal surface to darkening by oxidation. In addition, aminoalkyl silicon treated copper-clad cooking utensils and copper ash trays have been: (a) cured at 500° F. without discoloration, and (b) in normal use without showing signs of darkening due to cooking heat or extinguishing of cigarettes.

(3) *Resistance to vapor and liquid phase attack under alkaline, neutral, and acid conditions.*—Metal specimens were placed in glass beakers containing the below listed chemical solutions. These beaker tests which were performed on a laboratory bench gave accelerated corrosion conditions. Resistance to corrosion was evaluated by: (1) visual observation of metal darkening or pitting by comparison to an untreated specimen, and (2) in item *d*, weight losses due to copper dissolving in ammonia water were made and the degree of protection afforded by the aminoalkyl silicon compound was calculated.

(a) Corrosive water (see Table III)
(b) Alkaline sulfide water
(c) Acid sulfide water
(d) Ammonia water
(e) Salt water
(f) Salt spray chamber
(g) Aerated water The following examples are illustrative of this invention:

EXAMPLE I

*Resistance to Oxidation*

Gamma-aminopropylsilicone was prepared by charging 220 gm. gamma-aminopropyltriethoxysilane and 130 gm. anhydrous ethanol into a 1000 ml. flask equipped with stirrer, reflux condenser, thermometer, and separatory funnel. In a period of 15–20 minutes, 50 grams water was added with stirring. The contents were heated to reflux for one-half hour. One pint of water-white solution was obtained. This resin solution was diluted with anhydrous alcohol to give the silicone treating solution consisting of 1 part resin solution to 5 parts by weight anhydrous alcohol.

A copper strip 1½ x 6 inches) was prepared for coating by scouring with an alkaline cleanser. It was then flushed with water and dried. A portion of this metal strip was then immersed in the silicone treating solution, removed, and allowed to drain and air dry. This strip was then hung in the 250° C. air circulating oven for 4 hours. After this time it was removed. Where the strip had been aminoalkyl silicone treated, the surface was bright and had its original luster. Where the copper strip had not been treated, it was dark and oxidized.

EXAMPLE II

*Aminoalkyl Silicone Compounds as Coatings for Metals to Provide Protection From Oxidation at Ambient Temperatures*

Four 1½ x 6 inch steel panels were thoroughly scoured with alkaline cleaner, washed, then dried. Two panels were then partially dipped in a 5 percent gamma-aminopropylsilicone in ethanol. The other two panels were partially dipped in a 5 percent copolymer of delta-aminobutyl-methyl- and phenylsilicone in ethanol. One panel coated with the silicone polymer and one coated silicone copolymer were treated 5 minutes at 150° C. in an air circulating oven. There was no visible change in panel appearance. The remaining panels were treated one-half hour at 250° C. in an air circulating oven. Under these 250° C. conditions, the treated areas had yellowed somewhat. All four panels were then exposed to overnight industrial atmosphere. Since it was fall, there was a reasonable amount of dew. In the morning all untreated areas on the panels were heavily coated with a film of red iron oxide rust. The aminoalkyl silicone-treated areas had not significantly changed in appearance. There was essentially 100 percent protection to atmospheric corrosion.

EXAMPLE III

Four steel panels were prepared exactly as in Example II for the following tests. Two panels were partially dipped in 5 percent monooleate salt of Duomeen T[1] in ethanol. Two panels were partially dipped in 5 percent dioleate salt of Duomeen T in ethanol. These treatments gave the panels a greasy film. One panel each of the mono- and dioleate salts were then heated for 5 minutes at 150° C. This heat treatment somewhat darkened the coated panel area.

The remaining panels were heated one-half hour at 250° C. in an air circulating oven. This heat treatment markedly darkened the panels. All four panels were then exposed to overnight industrial atmosphere. Since it was fall, there was a reasonable amount of dew. When examined, only the 150° C. panel partially coated with the monooleate salt of Duomeen T showed a small amount of protection against corrosion. All other panels were badly corroded and offered essentially no protection to corrosion.

Examples II and III show commercially available organic corrosion preventatives are essentially completely ineffective as corrosion preventatives for metals by comparison with the aminoalkyl silicone compounds of this invention under the same test conditions.

Table I below summarizes several other tests showing

---

[1] Duomeen T monooleate and dioleate salts are commercially available anti-corrosion agents. Duomeen T has the following formula:

where R is an alkyl group derived from the fatty acids in tallow. R would have carbon chains predominantly 16 and 18 units long. The oleate and dioleate soaps are the equivalently neutralized soaps of the Duomeen T base.

protection from atmospheric corrosion as afforded by the aminoalkyl silicone coatings of this invention. In all instances uncoated metal surfaces were simultaneously used as control to observe effect. In all instances there was superior resistance to corrosion afforded by the aminoalkyl silicone coating.

dizing nature of copper and the effective protection against oxidation at high temperature afforded by a coating of gamma-aminopropyltriethoxysilane.

EXAMPLE VI

A 5 percent solution of metaphenylenediamine and a

TABLE I.—AMINOALKYL SILICONE COMPOUNDS AS COATINGS FOR METALS TO PROVIDE PROTECTION FROM ATMOSPHERIC CORROSION

| Silicone compound used as metal coating [1] | Metal surface to which silicone coating is applied | Corrosive atmosphere |
|---|---|---|
| (1) Gamma-aminopropylsilicone | Clean alumininum panel | Industrial atmosphere. |
| (2) Gamma-aminopropyltriethoxysilane | Clean copper strips | Do. |
| (3) Gamma-aminopropylsilicone | do | Do. |
| (4) Gamma-aminopropylsilicone | Copper-plated carbon electrode | Laboratory atmosphere. |
| (5) Oleate salt of 10 percent gamma-aminopropylmethyl modified dimethyl copolymer oil (M.W 10,000). | Chromium-plated bumpers | Winter streets, ice, snow, rain, salt. |
| (6) Delta-aminobutylmethylsilicone | Cleaned steel panels | Industrial atmosphere. |
| (7) 1:1 Copolymer of delta-aminobutylmethylsilicone and phenylsilicone. | do | Do. |
| (8) 1:1 Copolymer of delta-aminobutylmethylsilicone and dimethylsilicone. | do | Do. |
| (9) Same composition as in Example 7 and 8 above | Shotgun barrel | Rain and snow in a duck blind. |
| (10) Gamma-aminopropylsilicone | Bronze railing | Lobby of research laboratory. |
| (11) 1:1 Copolymer of gamma-aminopropylsilicone and phenylsilicone | Silver teaspoon | Domestic usage. |
| (12) $[H_2N(CH_2)_3SiO_{3/2}]_{0.5}(\phi SiO_{3/2})_{0.4}(Me_2SiO)_{0.1}$ | Cleaned steel panels | Industrial atmosphere. |
| (13) $[H_2N(CH_2)_3SiO_{3/2}]_{0.5}(\phi SiO_{3/2})_{0.3}(Me_2SiO)_{0.2}$ | do | Do. |
| (14) $[H_2N(CH_2)_3SiO_{3/2}]_{0.5}(\phi SiO_{3/2})_{0.3}(C_5H_{11}SiO_{3/2})_{0.2}$ | do | Do. |
| (15) $[H_2N(CH_2)_3SiO_{3/2}]_{0.5}(\phi SiO_{3/2})_{0.3}(C_2H_5SiO_{3/2})_{0.2}$ | do | Do. |
| (16) $[H_2N(CH_2)_3SiO_{3/2}]_{0.5}(\phi SiO_{3/2})_{0.2}(Me_2SiO)_{0.3}$ | do | Do. |
| (17) $[H_2N(CH_2)_3SiO_{3/2}]_{0.3}(\phi SiO_{3/2})_{0.6}(Me_2SiO)_{0.1}$ | do | Do. |
| (18) Multipolymers: | | |

| $[H_2N(CH_2)_3SiO_{3/2}]$ Mole-percent | $[MeSiO_{3/2}]$ Mole percent | $[Me_2SiO]$ Mole percent | $[\phi SiO_{3/2}]$ Mole percent | $[\phi_2 SiO]$ Mole percent | | |
|---|---|---|---|---|---|---|
| 0.46 | 0.08 | 0.25 | 0.18 | 0.03 | do | Do. |
| 0.32 | 0.10 | 0.31 | 0.24 | 0.03 | do | Do. |
| 0.18 | 0.12 | 0.37 | 0.29 | 0.04 | do | Do. |

[1] Silicones in all examples except No. 5 were applied from 5–10 percent solution in alcohol by either dipping or brushing. No. 5 was applied by wiping 100% silicone on chromium bumper. Coatings in Examples 1, 6, 7, 8, and 11 were given a 10–15 minute bake at 150° C. before exposure to corrosive atmosphere. Other coatings received no heat treatment.

NOTE.—In all instances the uncoated specimens or uncoated areas on treated specimens, which served as controls, corroded badly. Substantially no corrosion was observed on the treated metals.

EXAMPLE IV

*Aminoalkyl Silicone Compounds as Coatings for Metals to Inhibit High Temperature Oxidation*

A copper panel was scoured with an alkaline cleanser, rinsed with water, and placed in a 250° C. air circulating oven for 1 hour. After this period it was removed. Examination revealed it had completely darkened; there was no bright, shiny copper surface present. The entire metal surface had oxidized under these conditions.

EXAMPLE V

A 5 percent by weight solution of gamma-aminopropyltriethoxysilane was prepared by adding 5 grams of the aminoalkyl silicon compound to 95 grams of ethanol. A similarly sized and cleaned piece of copper as described in Example IV was immersed in the alcohol solution. The panel was removed from the solution and allowed to drain dry. It was then placed in a 150° C. oven for a 5 minute cure. Thereafter it was placed in a 250° C. air circulating oven for one hour. After this period it was removed. Examination revealed it had not darkened. No perceptible oxidation occurred. The copper was bright and shiny. The sample was returned to the 250° C. oven for an additional 3 hours. It was again examined and there was no evidence to indicate oxidation of the copper had occurred. This coated copper panel was heated at 250° C. in the air circulating oven for one week. Again when it was removed, no black oxide was observed. The bright, shiny copper surface was essentially unchanged.

Examples IV and V demonstrate respectively the oxi- 5 percent solution of parahydroxydiphenylamine was prepared by dissolving the organic amine in ethanol. Copper strips of equivalent size and cleanliness as described in Examples IV and V were immersed in these organic amine solutions. The panels were removed from the solutions and allowed to drain. These two panels were placed in a 150° C. oven for a 5 minute cure. These copper panels were then placed in a 250° C. air circulating oven for 1 hour. After this period they were removed; visual examination revealed the panels had completely darkened. There was no bright, shiny metal in evidence. These two panels were replaced in the 250° C. oven for an additional 68 hours. When removed from the oven, they were completely coated with a black copper oxide that could be flaked off the surface.

This example illustrates the ineffectiveness of coatings of organic amines on copper for protection from air oxidation at 250° C.

EXAMPLE VII

A 5 percent toluene solution of 100 cstk. dimethylsilicone was prepared. This solution was applied on a clean copper panel by brushing and was allowed to air dry. It was placed in the 150° C. oven for 5 minutes. It was then placed in the 250° C. oven for 3 hours. When the panel was removed, the copper panel had turned dark. Similarly, the conventional silicone resins having an R to Si ratio of about 1.55 and consisting of phenyl and methyl groups attached to silicon and used as insulating and protective coatings were without effect on the prevention of air oxidation of copper at 250° C.

It is thus demonstrated that not only are organic amines ineffective as protective coatings for metals (Example VI) but also that conventional silicones are also ineffective to protect metals from air oxidation at high temperatures.

Table II below lists the aminoalkyl silicon monomers, polymers, and copolymers that were tested on bright copper metal at 250–275° C. in a manner similar to the tests described in Example V. The results indicated all aminoalkyl silicone compounds having an amino group attached to silicon through at least three carbons afforded protection from 250° C. air oxidation. Superior results were obtained using gamma-aminopropyltriethoxysilane and delta-aminobutyltriethoxysilane and their polymers. Substantial improvements with respect to no treatment or organic amine treatment, were obtained using the other aminoalkyl silicone compositions. In addition, gamma-aminopropylsilicone, when applied to a copper panel, one part of which was left untreated, provided a protective coating to the treated portion of the panel when exposed to 1200° F. for a period of ten minutes in a muffle furnace. The untreated portion was rapidly and completely oxidized.

TABLE II.—AMINOALKYL SILICONE COMPOUNDS AS COATINGS FOR THE PROTECTION OF COPPER METAL FROM 250° C. AIR OXIDATION

Silicone compound used as coating on copper metal:
(1) $NH_2(CH_2)_3Si(OEt)_3$—Gamma-aminopropyltriethoxysilane
(2) $NH_2(CH_2)_4Si(OEt)_3$—Delta aminobutyltriethoxysilane
(3) $\phi$-$N(CH_3)(CH_2)_4Si(OEt)_3$—N phenyl N methyl delta-aminobutyltriethoxysilane (4)
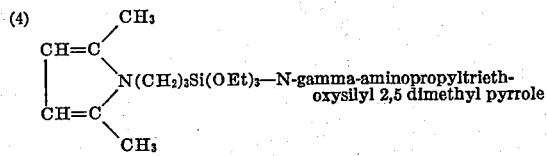
N-gamma-aminopropyltriethoxysilyl 2,5 dimethyl pyrrole (5) $HN[(CH_2)_3Si(OEt)_3]_2$—Bis (gamma-triethoxysilylpropyl)amine
(6) Polymer of delta-aminobutylmethylsilicone
(7) Polymer of No. 1—Gamma-aminopropylsilicone
(8) Polymer of No. 2—Delta-aminobutylsilicone
(9) Polymer of No. 3—N phenyl N methyl delta-aminobutylsilicone
(10) Polymer of No. 4—Gamma-(2,5-dimethyl pyrryl) propylsilicone
(11) Copolymer of delta-aminobutylsilicone and phenylsilicone
(12) Copolymer of delta-aminobutylmethylsilicone and phenylsilicone
(13) Copolymer of gamma-aminopropylsilicone and vinylsilicone [1]

[1] The copolymer of gamma-aminopropylsilicone and vinylsilicone was prepared by charging to a 1 liter 3-neck round-bottom flask equipped with reflux condenser, agitator, thermometer, and dropping funnel:

95 grams vinyltriethoxysilane
110 grams gamma-aminopropyltriethoxysilane
130 grams anhydrous ethanol The mixture was slurried and over a period of 20 minutes, 50 grams of water were added. The solution was then heated to reflux at 80° C. and maintained at this temperature for 45 minutes.
The following lists the properties for the product:

| Analysis | Theoretical | Found |
|---|---|---|
| Percent solids | 24.6 | 25.3 |
| Percent silicon | 7.3 | 7.5 |
| Percent NH$_2$ | 2.08 | 1.98 |
| Bromine number | 20.6 | 20.0 |

EXAMPLE VIII

Several copper panels were dip-coated in alcohol solutions of gamma-aminopropylsilicone, the concentration of which was varied to obtain coatings of different thicknesses. Although undiluted silicone compounds may be applied to the surface, this technique gives heavy coatings. The thinner coatings were calculated from weight increases, and the results obtained are listed:

Silicone in solution (weight percent): Thickness of coating (mils)
5 ---- 0.04
2 ---- 0.014
0.5 ---- 0.0035
0.1 ---- 0.0018
0.05 ---- 0.0012
Nil ---- -----

All of these copper specimens when placed in a 275° C. air circulating oven for one-half hour showed improvement over the untreated sample. As the coating thickness decreased below 0.003 mil, protection against these severe oxidation conditions was impaired. In no instance, however, did any specimen turn the dark color of the strongly oxidized, uncoated metal. It is thus seen that even very thin coatings are effective in inhibiting oxidation on an otherwise highly oxidizable metal such as copper.

EXAMPLE IX

A brass panel 1 x 5 inches was scoured with alkaline cleanser and washed to give a clean surface. A portion of this panel was immersed in 10 percent delta-aminobutyltriethoxysilane in ethanol. The panel was removed and allowed to air dry. The panel was then placed in a 275° C. air circulating oven for 136 hours. When removed from the oven, the untreated area of the panel had become a deep yellow color. The coated area of the panel retained its original brass tone.

EXAMPLE X

Clean brass panels cleaned as described in Example IX were respectively partially dipped in 10 percent solution of delta-aminobutylmethyldiethoxysilane in ethanol and 5 percent alcohol solutions of delta-aminobutylmethylsilicone and delta-aminobutylsilicone. Each of these panels was treated exactly as that described in Example IX. When these panels were removed from the 275° C. oven, the untreated brass area had significantly darkened in color, and the aminoalkyl silicone coated areas still retained their original brass appearance.

Examples IX and X clearly demonstrate that aminoalkyl silicone compounds prevent the high temperature air oxidation of brass.

In the following two examples corrosive water containing 100 p.p.m. each of chloride, sulfate, and bicarbonate ions, all present as sodium salts, was used. This solution is particularly corrosive media for steel and other metals.

EXAMPLE XI

A 1½ x 6 inch SAE 1020 steel panel was scoured free of all grease with an alkaline cleanser. It was then partially immersed in a 200 cc. beaker containing corrosive water. In 20 hours this uncoated steel panel had badly discolored and there was much rust present in the water.

Table III below lists all the metals studied in the corrosive water test. All metals were scoured clean and dipped in either a 5 percent polymer or copolymer or a 10 percent monomer solution in ethanol. The panels were drained then cured 1 hour at 150° C. The panels were then placed in 2-3 inches of corrosive water and the rate of corrosion visually observed over a 4-day period. Under the test conditions the uncoated metals readily corroded whereas the coated metals were inhibited from corrosion. The x marks in Table III indicate specific tests of aminoalkyl silicone coated metals. The blanks in the table indicate these combinations were not tested.

by momentarily dipping in 18 percent HCl. It was then scoured to remove all traces of corrosion products, and

TABLE III

| Silicon compound used as coatings on metals | Coated metals found to be inhibited against corrosion when immersed in corrosive [a] water for four days | | | | | |
|---|---|---|---|---|---|---|
| | Copper | Aluminum | Steel [b] | Zinc | Magnesium | Terne plate (tin plate) |
| A. Monomers: | | | | | | |
| (1) Gamma-aminopropyltriethoxysilane | | | X | | | |
| (2) Delta-aminobutyltriethoxysilane | X | | | | | |
| (3) Beta-aminophenylethyltriethoxysilane | X | | | | | |
| (4) Delta-aminobutylmethyldiethoxysilane | X | | | | | |
| (5) N-betacyanoethyl delta-aminobutyltriethoxysilane | X | | | | | |
| B. Polymers: | | | | | | |
| Gamma-aminopropylsilicone (Polymer of 1) | X | X | X | | | X |
| Delta-aminobutylsilicone (Polymer of 2) | X | | | | X | |
| Beta-aminophenylethylsilicone (Polymer of 3) | X | | | X | | |
| Delta-aminobutylmethylsilicone (Polymer of 4) | X | X | X | | | X |
| 1:1 copolymer of No. 1 and $\phi Si(OEt)_3$ [c] | X | | | | | |
| 1:1 copolymer of No. 2 and $\phi Si(OEt)_3$ | X | | | | X | |
| Copolymer of 1 mole of No. 2 and 3 moles $\phi Si(OEt)_3$ | X | X | X | | | X |
| 1:1 copolymer of No. 1 and $\phi MeSi(OEt)_2$ | X | | | | X | |
| 1:1 copolymer of No. 4 and $\phi Si(OEt)_3$ | X | | | | | |
| 1:1 copolymer of No. 4 and $Me_2Si(OEt)_2$ | X | | | | | |

[a] Contains 100 p.p.m. each of chloride, bicarbonate, and sulfate as the sodium salts.
[b] Corrosive water studies on steel were run for 20 hours.
[c] The copolymer of phenylsilicone and gamma-aminopropylsilicone was prepared by the following method—To a 2,000 ml. flask equipped with a stirrer, reflux condenser, thermometer, and separatory funnel there was charged:

| | Grams |
|---|---|
| 1 mole phenyltriethoxysilane | 240 |
| 1 mole gamma-aminopropyltriethoxysilane | 220 |
| Anhydrous alcohol | 260 |

In a period of 15 to 20 minutes, 100 g. water was added and after the 30-minute reflux period, there was obtained one quart of water white solution.

| | Found | Theory |
|---|---|---|
| Percent silicone solids | 29.0 | 29.2 |
| Amino content (by acid titration) | 1.95 | 1.90 |
| Silicon content | 7.3 | 6.8 |
| Amino/silicon ratio calculated | 0.47 | 0.50 |

By varying the monomers of combination of monomers essentially all of the polymer and copolymer formulations were thus prepared. This preparation typifies the preparation of the monomers and polymers discussed herein by the hydrolysis and condensation method. Copolymers have also been prepared by the following method of equilibration— Preparation by equilibration of $H_2N(CH_2)_3Si(OEt)_3$ with condensed silicones: To a 1 liter round-bottomed flask equipped with a reflux condenser and thermometer, the following was added:

| | Grams |
|---|---|
| $H_2N(CH_2)_3Si(OEt)_3$ | 120 |
| 50 percent solids solution of silicone resin [1] in toluene at 110 cps. visc. | 480 |

[1] Resin composition = $(MeSiO_{3/2})_{0.15}(Me_2SiO)_{0.45}(\phi SiO_{3/2})_{0.35}(\phi_2 SiO)_{0.05}$ This mixture was refluxed 7 hours at 115° C. The product, approximately 580–590 g., had the following properties: Viscosity, 29 cps.; percent solids (1 hr. at 150° C.), 49.4 percent.

The following qualitative observations were made:

| Metals under corrosive water test | Observations |
|---|---|
| I. Aluminum blank | Reacts almost immediately to evolve gas and increase alkalinity of corrosive water from pH 7.0 to greater than pH 10. |
| Coated aluminum | No gas evolution, no pH change. |
| II. Zinc magnesium and copper blanks. | Readily corrodible metals, corrosion occurs within 16 hours. |
| Coated zinc magnesium and copper. | After 48 hours no visible evidences of corrosion. |

Alkaline sulfide water as used in our tests consists of a 0.05–0.1 percent sodium sulfide solution. This solution is strongly alkaline having a pH greater than 10. Even though it is basic, by a dissociation mechanism, an atmosphere of $H_2S$ is present over the solution. The solution's disagreeable smell is direct proof for the acid gas. This test solution was chosen since it can measure both alkaline aqueous corrosion and vapor phase acid corrosion simultaneously. It was necessary to only partially immerse a metal panel in a beaker containing the corrosive solution and visually observe the progress of corrosion in both areas over a 2-day period.

It is well known in the art that alkaline solutions readily dissolve silicone materials, and it was, therefore, totally unexpected that coatings of 0.001–0.05 mil thickness provides such excellent protection under these conditions.

EXAMPLE XII

A 1 inch x 5 inch copper metal strip was cleaned by momentarily dipping in 18 percent HCl. It was then scoured to remove all traces of corrosion products, and thereafter dried by placing in acetone then wiping clean with absorbent paper. It was then placed in a 200 cc. beaker containing 0.05 percent sodium sulfide. Within 1 minute the copper metal immersed in the water had darkened. Within 1½ hours marked vapor phase attack had also occurred.

EXAMPLE XIII

A 1 inch x 5 inch copper panel cleaned exactly as in Example XII was completely immersed in 5 percent gamma-aminopropylsilicone in ethanol. It was removed and allowed to drain. It was then placed in a 150° C. oven for 5 minutes. Then, it was placed in 0.05 percent sodium sulfide solution. After 1½ hours contact there was neither liquid phase nor vapor phase discoloration. The copper had exactly the same appearance as prior to dipping in the corrosive medium.

Examples XII and XIII clearly show the effectiveness of aminoalkyl silicone coatings in preventing corrosion of metals from alkaline sulfide water.

Table IV summarizes the silicon compounds coated on various metals which were evaluated in this test. It was observed most uncoated metals were almost immediately corroded by this medium. However, in all the instances where the aminoalkyl silicone coatings were used, good corrosion protection was supplied by the coatings. In the table the x marks indicate the combinations of metals and coatings tested. The blank spaces mean these combinations were not tested.

TABLE IV

| Silicon compounds used as coatings on metals | Coated metals found to be inhibited against corrosive attack when immersed in 0.05-0.1% sodium sulfide water | | | | | | |
|---|---|---|---|---|---|---|---|
| | Copper | Aluminum | Lead | Tin | Magnesium | Brass | Silver |
| A. Monomers: | | | | | | | |
| (1) Gamma-aminopropyltriethoxysilane | X | | | | | | |
| (2) Delta-aminobutyltriethoxysilane | X | | | | | | |
| (3) Beta-aminophenylethyltriethoxysilane | X | | | | | | |
| (4) Delta-aminobutylmethyldiethoxysilane | X | | | | | | |
| (5) Bis(gamma-triethoxysilylpropyl)amine | X | | | | | | |
| (6) N-beta-cyanoethyl gamma-aminopropyltriethoxysilane | X | | | | | | |
| B. Homopolymers: | | | | | | | |
| Gamma-aminopropylsilicone (polymer of No. 1) | X | X | | X | | X | |
| Delta-aminobutylsilicone (polymer No. 2) | X | | | X | X | | |
| Beta-aminophenylethylsilicone (polymer of No. 3) | | | | X | X | | |
| Delta-aminobutylmethylsilicone (polymer of No. 4) | X | | | | | | |
| Bis(gamma)propylsilicone)amine (polymer of No. 5) | X | | | | | | |
| C. Copolymers: | | | | | | | |
| 1:1 copolymer No. 1 and $\phi Si(OEt)_3$ | X | X | X | | | X | X |
| 1:1 copolymer of No. 2 and $\phi Si(OEt)_3$ | X | | | X | X | | |
| 1:3 copolymer of No. 2 and $\phi Si(OEt)_3$ | X | | | | | | X |
| 1:1 copolymer of No. 4 and $\phi MeSi(OEt)_2$ | | | | | | | |
| 1:1 copolymer of No. 4 and $Me_2Si(OEt)_2$ | X | | | X | | | |
| D. Terpolymers: | | | | | | | |
| $[H_2N(CH_2)_3SiO_{3/2}]_{0.5}(\phi SiO_{3/2})_{0.4}(Me_2SiO)_{0.1}$ | | | | | | | X |
| $[H_2N(CH_2)_3SiO_{3/2}]_{0.5}(\phi SiO_{3/2})_{0.3}(Me_2SiO)_{0.2}$ | | | | | | | X |
| $[H_2N(CH_2)_3SiO_{3/2}]_{0.5}(\phi SiO_{3/2})_{0.3}(C_5H_{11}SiO_{3/2})_{0.2}$ | | | | | | | X |
| $[H_2N(CH_2)_3SiO_{3/2}]_{0.5}(\phi SiO_{3/2})_{0.3}(C_2H_5SiO_{3/2})_{0.2}$ | | | | | | | X |
| $[H_2N(CH_2)_3SiO_{3/2}]_{0.5}(\phi SiO_{3/2})_{0.2}[Me_2SiO]_{0.3}$ | | | | | | | X |
| $[H_2N(CH_2)_3SiO_{3/2}]_{0.3}(\phi SiO_{3/2})_{0.5}[Me_2SiO]_{0.2}$ | | | | | | | X |
| E. Multipolymers: | | | | | | | |

| $[H_2N(CH_2)_3SiO_{3/2}]$ mole-percent | $[MeSiO_{3/2}]$ mole-percent | $[Me_2SiO]$ mole-percent | $[\phi SiO_{3/2}]$ mole-percent | $[\phi_2SiO]$ mole-percent | | | | | | |
|---|---|---|---|---|---|---|---|---|---|---|
| 0.46 | 0.08 | 0.25 | 0.18 | 0.03 | X | | | | | X | |
| 0.32 | 0.10 | 0.31 | 0.24 | 0.03 | X | | | | | X | X |
| 0.18 | 0.12 | 0.37 | 0.29 | 0.04 | X | | | | | | |

In Table IV the copper and magnesium specimens were prepared by acid treating the surface prior to scouring. All other metals with the exception of silver were scoured with an alkaline cleanser. The silver surface was degreased with perclene (tetrachlorethylene).

The following observations were made during this study: Untreated copper, lead, silver, and brass all corroded and darkened in 1-2 minutes in the sulfide solution. Within 1½ hours there was marked vapor phase corrosion on the copper. Unprotected aluminum reacted to evolve gas almost immediately. However, the use of aminoalkyl coatings inhibited these corrosions. Coated copper never did show vapor phase attack. Silver was essentially untarnished even after 24 hours' exposure and with some coatings the aluminum showed no attack even after three days' exposure. These coated metals showed complete resistance to liquid phase corrosion for the following periods: copper, 4 hours; lead, 2 hours; brass, 2 hours; tin, 2 days; magnesium, 2 days.

Acid sulfide water as used in our tests comprises a 0.10 percent solution of hydrogen sulfide in distilled water. In addition, there was admixed portions of concentrated HCl so that solutions having a pH of 4.0 to 1.5 were obtained. By partially immersing an aminoalkyl silicone coated copper panel in the beaker, corrosion due to both aqueous and vapor phase could be observed. It is well known that acidic systems facilitate the solution of alkaline substances. It was therefore totally unexpected to find aminoalkyl silicone coatings resistant to corrosion in acidic sulfide solutions.

EXAMPLE XIV

One-inch by five-inch copper strips were scoured with alkaline cleanser, washed, and dried. They were completely immersed in 5 percent gamma-aminopropylsilicone in ethanol, air dried, then cured 30 minutes at 150° C. These strips were then placed in beakers containing acidic sulfide water. The pH of these solutions were 4.0, 2.5, 1.5. After 100 minutes' exposure in these solutions, the aminoalkyl silicone coated copper strips were bright and shiny and showed no signs of darkening. However, uncoated copper strips oxidized and turned black in less than 5 minutes' contact with these solutions. There was no vapor phase attack of coated copper even after 2 days' contact in this atmosphere. Vapor phase corrosion occurred rapidly with the uncoated copper strips.

EXAMPLE XV

Four copper panels were prepared having an exposed surface area of 12 sq. cm. by the procedure described in Example XII. Three of these panels were coated by immersing in 5-10 percent aminoalkyl silicone solutions. The panels were withdrawn from the solution and excess coating solution blotted from the coated panel. These treated panels were cured by heat treating them one hour at 150° C. By reweighing these panels, the amount of silicone coating present on the panel was determined. All four panels were completely immersed in beakers containing 0.3-0.4 percent NH$_4$OH. Ammonium hydroxide saturated air, saturated by passing through a gas washing bottle containing 0.3-0.4 percent NH$_4$OH was supplied to the beakers. After three hours the panels were removed from the NH$_4$OH water and obtained their dry weights. These panels were then returned to their respective beakers for an additional four-hour corrosion period.

During this last exposure period the uncoated copper specimen became heavily coated with a blue-gray oxide film (verdigris) which effectively prevented its further corrosion. At the end of the test, the specimens coated with the silicone polymers showed only slight corrosive attack. The specimen coated with the silicone ester had darkened over its surface—probably the start of an oxide coating. The results of those tested are tabulated as follows:

| Coating on copper specimen | Coating | | Weight loss (mg./12 sq. cm. copper) | |
|---|---|---|---|---|
| | Weight (g.) | Thickness (mils) | 1st 3 hr. | For 7 hr. |
| Blank (no coating) | | | 29.6 | (¹) |
| Delta-aminobutyltriethoxysilane | 0.0019 | 0.020 | 18.8 | 25.5 |
| Delta-aminobutylsilicone | 0.0029 | 0.034 | 1.5 | 2.3 |
| Delta-aminobutylmethylsilicone | 0.0039 | 0.044 | 1.1 | 2.6 |

¹ Insoluble oxides coated onto metal.

The percent protection afforded by the coating may be calculated according to this formula:

$$\text{Percent protection} = \frac{\text{Rate uncoated} - \text{rate coated}}{\text{Rate uncoated}} \times 100$$

Since rate=weight loss per unit time and each reported weight loss occurred in the same period (3 hours):

$$\text{Percent protection} = \frac{29.6 - \text{wt. loss}}{29.6} \times 100$$

It is not possible with the above data to directly calculate the protection during the 7-hour exposure to corrosion since the uncoated specimen was coated with oxide film which makes its weight loss meaningless. If it is assumed that corrosion would occur in the same rate during the additional 4-hour period, a total weight loss for the uncoated copper would be 69.2 mg. Therefore:

$$\text{Percent protection} = \frac{69.2 - \text{wt. loss}}{69.2} \times 100$$

Calculated data are listed for 3 and 7 hour corrosion periods.

| Coating on copper specimen | Percent protection from corrosion in— | |
|---|---|---|
| | 3 hours | 7 hours |
| Delta-aminobutyltriethoxysilane | 36.5 | 63.0 |
| Delta-aminobutylsilicone | 95.0 | 96.6 |
| Delta-aminobutylmethylsilicone | 96.5 | 96.3 |

This example clearly shows aminoalkyl silicone monomer, polymer, and copolymer coatings on copper metal effectively inhibit corrosion in aerated NH₄OH water. Although definite protection was provided by aminoalkyl monomer films, superior results were obtained by using polymers and copolymers. This invention teaches both coating thicknesses and degree of polymerization regulates the resistance to solubility of these coatings to alkaline sulfide solution. Better protection is provided by the thicker and more insoluble coatings.

EXAMPLE XVI

A commercially pure (Mg, 96 percent; Al, 3 percent; Zn, 1 percent) 1½ x 3 inch magnesium panel was cleaned by pickling it in dilute $H_2SO_4$ then scouring the surface until clean. The panel was dried after first giving it an acetone rinse. This panel was placed in a 200 cc. beaker containing some 5 percent salt solution. Within 1 hour there was evidence of corrosion. After 16 hours this panel was badly corroded.

EXAMPLE XVII

A magnesium panel cleaned exactly as described in Example XVI was dipped in acetone and allowed to dry. This panel was then immersed in a 5 percent copolymer consisting of delta-aminobutylmethyl- and phenylsilicone units. It was then cured in the 150° C. oven for 1 hour. The panel was then placed in a 200 cc. beaker containing 5 percent salt water. In 1 hour there was no evidence of corrosion. After 16 hours this panel showed no corrosive attack with the exception of a small area at the air-salt water interface.

Examples XVI and XVII clearly demonstrate the protection afforded magnesium from salt water corrosion by applying a coating of 0.05 mil thickness of aminoalkyl silicone compound in accordance with the present invention.

EXAMPLE XVIII

Three 1 x 5 inch copper panels were cleaned by giving them an 18 percent HCl acid dip. They were then scoured until they were clean. The panels were immersed in acetone, removed, and wiped dry. Two panels were coated by immersing them respectively in a 5 percent gamma-aminopropylsilicone solution in ethanol and a 5 percent copolymer of gamma-aminopropylsilicone and phenylsilicone in ethanol. These panels were allowed to dry by standing overnight at room temperature. The uncoated copper panel and the two aminoalkyl silicone coated panels were then placed in the 95° F. salt spray chamber. Air which atomized at 20 percent salt solution, was admitted to the chamber at 15 p.s.i.g. After 24 hours' treatment, it was observed that there was good protection for the coated panels. The uncoated panel showed green corrosion at this time. These tests clearly show aminoalkyl silicone coatings inhibit salt spray corrosion to copper metal.

EXAMPLE XIX

Two chrome plate steel panels (plated in accordance with automotive bumper specifications) were degreased with trichloroethylene. One panel was dip-coated in 5 percent delta-aminobutylmethyl-phenyl silicone copolymer in alcohol. This panel was air dried then cured 5 minutes at 150° F. Both panels were then placed in the salt spray chamber which was maintained at 100° F. Air saturated with water was aspirated at 14 p.s.i.g. into a 20 percent salt solution which created the salt fog. After 35 days' exposure to these conditions, the aminoalkyl-coated panel was essentially 100 percent free of rusting. The uncoated chrome panel was rusting badly.

EXAMPLE XX

Four 1½ x 3 inch carbon steel panels were scoured with alkaline cleanser until they were bright and shiny and free of all grease. With a soft cloth, these panels were dried. A thin film of the listed formulation was wiped onto the surface of the respective strips. Each strip was then placed in a 200 cc. beaker filled with distilled water. All beakers were aerated at room temperature for 24–72 hours. Visually observed and noted, the extent of corrosion was:

| Panel No. | Formulation | Amount of rust ¹ |
|---|---|---|
| 1 | Petroleum oil ² (15 g.) and the ½ oleate salt of delta-aminobutylmethylsilicone cyclic trimer and tetramer (5 g.). | B |
| 2 | Petroleum oil ² (control) | D |
| 3 | No coating (control) | D |
| 4 | Paraffin oil (18 g.) and the ½ stearate salt of 50 percent delta-aminobutylmethyl-modified dimethylsilicone oil (3.1 g.). | B |

¹ A=nil or trace; B=small; C=medium; D=large.
² Gulf Security Oil "A"—an uninhibited petroleum oil.

EXAMPLE XXI

Four aluminum panels were cleaned by scouring with an alkaline cleanser, flushed with water and dried. Three of these panels were respectively immersed in 10 percent resin solids in toluene solutions of the following multipolymers:

| [H$_2$N(CH$_2$)$_3$SiO$_{3/2}$] mole-percent | [MeSiO$_{3/2}$] mole-percent | [Me$_2$SiO] mole-percent | [$\phi$SiO$_{3/2}$] mole-percent | [$\phi_2$SiO] mole-percent |
|---|---|---|---|---|
| 0.46 | 0.08 | 0.25 | 0.18 | 0.03 |
| 0.32 | 0.10 | 0.31 | 0.24 | 0.03 |
| 0.18 | 0.12 | 0.37 | 0.29 | 0.04 |

Panels were allowed to air dry, heat cured at 150° C. for one hour, all four panels were then placed in a 3 percent aerated salt solution. Within two hours there was evidence of corrosion on the untreated aluminum panel. The coated aluminum panels were not corroded under these conditions. Some of the coated panels withstood five days' immersion in the salt solution without corrosion.

EXAMPLE XXII

Admixtures comprising:
(a) 5 grams N-beta-aminoethyl-gamma-aminopropyltrimethoxysilane
    9.5 grams distilled water
    85.5 grams absolute ethanol
(b) 5 grams N-beta-aminoethyl-gamma-aminoisobutylmethyldiethoxysilane
    9.5 grams distilled water
    85.5 grams absolute ethanol
(c) 5 grams N-gamma-aminopropyl-gamma-aminobutyltriethoxysilane
    9.5 grams distilled water
    85.5 grams absolute ethanol were prepared and each admixture employed to treat two clean copper panels. The resulting six panels were air dried for a period of about two hours and were then placed in an oven heated at a temperature of 150° C. for a period of fifteen minutes to cure the silicon compounds.

One set of panels treated with the above admixtures was then placed in an air circulating oven maintained at a temperature of 250° C. along with a clean untreated panel. After a period of 16 hours the four panels were removed from the oven and examined. It was noted that the three treated panels retained their initial copper color while the untreated panel has become completely black.

The remaining set of treated panels along with a clean untreated panel were immersed in an 0.1 percent solution of sodium sulfide. It was noted that the untreated panel turned black in color almost instantly while the treated panels retained their initial color.

This application is a continuation-in-part of our copending United States application Serial No. 672,873 filed July 19, 1957, now abandoned.

What is claimed is:

1. A process for providing a protective coating for a substrate selected from the group consisting of the metals lying below and including magnesium in the electromotive series and alloys thereof, which comprises applying to the surface of said substrate to form a film thereon an aminoalkyl silicon compound which contains the group:

$$(>N-R-Si\equiv)$$

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH$_2$)$_a$Si≡], wherein (a) is an integer of at least 3, and wherein at least one free bond of silicon in each of said (>N—R—Si≡) and said [—(CH$_2$)$_a$Si≡] groups is attached to a group selected from the class consisting of alkyl and silicon through Si—O bonds and the remaining free bonds of silicon are attached to hydrocarbyl, and curing said aminoalkyl silicon compound on said surface to form an adherent coating thereon.

2. A process as defined in claim 1, wherein said film is air-dried to cure said aminoalkyl silicon compound.

3. A process as defined in claim 1, wherein said aminoalkyl silicon compound is applied in a solvent solution.

4. A process for providing protective coating for a substrate selected from the group consisting of the metals lying below and including magnesium in the electromotive series and alloys thereof, which comprises applying to the surface of said substrate to form a film thereon an aminoalkylsilane of the formula:

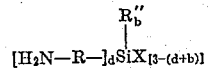

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from the silicon, R'' represents a hydrocarbon group selected from the class consisting of the alkyl and the aryl groups, X represents an alkoxy group selected from the class consisting of methoxy, ethoxy and propoxy, (b) is an integer having a value of from 0 to 2, (d) is an integer having a value of from 1 to 2, and the sum of (d+b) is not greater than 3, and curing said aminoalkylsilane on said surface to form an adherent coating thereon.

5. A process for providing a protective coating for a substrate selected from the group consisting of the metals lying below and including magnesium in the electromotive series and alloys thereof, which comprises applying to the surface of said substrate to form a film thereon an aminoalkylpolysiloxane containing the unit:

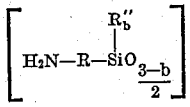

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from the silicon, R'' represents a hydrocarbon group selected from the class consisting of the alkyl and the aryl groups, and (b) is an integer having a value of from 0 to 2, and curing said aminoalkylpolysiloxane on said surface to form an adherent coating thereon.

6. A process for providing a protective coating for a substrate from the group consisting of the metals lying below and including magnesium in the electromotive series and alloys thereof, which comprises applying to the surface of said substrate to form a film thereon an aminoalkylpolysiloxane containing the structural unit:

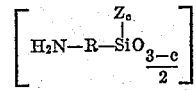

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from the silicon, Z represents a member selected from the group consisting of hydroxyl and alkoxy radicals, and (c) has an average value of from 0 to 2, and curing said aminoalkylpolysiloxane on said surface to form an adherent coating thereon.

7. A process for providing a protective coating for a substrate selected from the group consisting of the metals lying below and including magnesium in the electromotive series and alloys thereof, which comprises applying to the surface of said substrate to form a film thereon an organopolysiloxane containing amino groups attached to silicon through a carbon linkage of at least 3 carbons, the remainder of the groups attached to silicon being selected from the group consisting of methyl, ethyl, propyl, butyl, phenyl, naphthyl, tolyl, vinyl and cyclohexenyl groups, and curing said organopolysiloxane on said surface to form an adherent coating thereon.

8. A process for providing a protective coating for a substrate selected from the group consisting of the metals lying below and including magnesium in the electromotive series and alloys thereof, which comprises applying to the surface of said substrate gamma-aminopropyltriethoxysilane, and curing said gamma-aminopropyltriethoxysilane on said surface to form an adherent coating thereon.

9. A process for providing a protective coating for a substrate selected from the group consisting of the metals lying below and including magnesium in the electromotive series and alloys thereof, which comprises applying to the surface of said substrate gamma-aminopropylsiloxane, and curing said gamma-aminopropylsiloxane on said surface to form an adherent coating thereon.

10. A process for providing a protective coating for a substrate selected from the group consisting of the metals lying below and including magnesium in the electromotive series and alloys thereof, which comprises applying to the surface of said substrate delta-aminobutyltriethoxysilane, and curing said delta-aminobutyltriethoxysilane on said surface to form an adherent coating thereon.

11. A process for providing a protective coating for a substrate selected from the group consisting of the metals lying below and including magnesium in the electromotive series and alloys thereof, which comprises applying to the surface of said substrate delta-aminobutylsiloxane, and curing said delta-aminobutylsiloxane on said surface to form an adherent coating thereon.

12. A process for providing a protective coating for a substrate selected from the group consisting of the metals lying below and including magnesium in the electromotive series and alloys thereof, which comprises applying to the surface of said substrate delta-aminobutylmethylsiloxane, and curing said delta-aminobutylmethylsiloxane on said surface to form an adherent coating thereon.

13. A process for providing a protective coating for a substrate selected from the group consisting of the metals lying below and including magnesium in the electromotive series and alloys thereof, which comprises applying to the surface of said substrate N-aminoalkyl-gamma-aminopropyltrialkoxysilane, and curing said N-aminoalkyl-gamma-aminopropyltrialkoxysilane on said surface to form an adherent coating thereon.

14. A process for providing a protective coating for a substrate selected from the group consisting of the metals lying below and including magnesium in the electromotive series and alloys thereof, which comprises applying to the surface of said substrate a copolymer containing gamma-aminopropylsiloxane units and vinylsiloxane units, and curing said copolymer on said surface to form an adherent coating thereon.

15. A process for providing a protective coating for copper which comprises applying to the surface of said copper to form a film thereon an aminoalkyl silicon compound which conains the group:

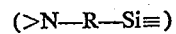

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—$(CH_2)_a$Si≡], wherein ($a$) is an integer having a value of at least 3, and wherein at least one free bond of silicon in each of said (>N—R—Si≡) and said [—$(CH_2)_a$Si≡] groups is attached to a group from the class of alkyl and silicon through Si—O bonds and the remaining free bonds of silicon are attached to hydrocarbyl, and heating said film to cure the aminoalkyl silicon compound on the surface of the copper.

16. A process for providing a protective coating for aluminum which comprises applying to the surface of said aluminum to form a film thereon an aminoalkyl silicon compound which contains the group:

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—$(CH_2)_a$Si≡], wherein ($a$) is an integer having a value of at least 3, and wherein at least one free bond of silicon in each of said (>N—R—Si≡) and said [—$(CH_2)_a$Si≡] groups is attached to a group from the class of alkyl and silicon through Si—O bonds and the remaining free bonds of silicon are attached to hydrocarbyl, and heating said film to cure the aminoalkyl silicon compound on the surface of the aluminum.

17. A process for providing a protective coating for chromium which comprises applying to the surface of said chromium to form a film thereon an aminoalkyl silicon compound which contains the group:

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—$(CH_2)_a$Si≡], wherein ($a$) is an integer of at least 3 and wherein at least one free bond of silicon in each of said (>N—R—Si≡) and said

groups is attached to a group from the class of alkyl and silicon through Si—O bonds and the remaining free bonds of silicon are attached to hydrocarbyl, and heating said film to cure the aminoalkyl silicon compound on the surface of the chromium.

18. A process for providing a protective coating for steel which comprises applying to the surface of said steel to form a film thereon an aminoalkyl silicon compound which contains the group:

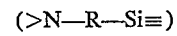

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—$(CH_2)_a$Si≡], wherein ($a$) is an integer of at least 3 and wherein at least one free bond of silicon in each of said (>N—R—Si≡) and said

groups is attached to a group from the class of alkyl and silicon through Si—O bonds and the remaining free bonds of silicon are attached to hydrocarbyl, and heating said film to cure the aminoalkyl silicon compound on the surface of the steel.

19. A process for providing a protective coating for bronze which comprises applying to the surface of said bronze to form a film thereon an aminoalkyl silicon compound which contains the group:

(>N—R—Si≡)

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH₂)ₐSi≡], wherein (a) is an integer of at least 3 and wherein at least one free bond of silicon in each of said (>N—R—Si≡) and said [—(CH₂)ₐSi≡] groups is attached to a group from the class of alkyl and silicon through Si—O bonds and the remaining free bonds of silicon are attached to hydrocarbyl, and heating said film to cure the aminoalkyl silicon compound on the surface of the bronze.

20. A process for providing a protective coating for a silver surface which comprises applying to the silver surface to form a film thereon an aminoalkyl silicon compound which contains the group:

(>N—R—Si≡)

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH₂)ₐSi≡], wherein (a) is an integer of at least 3 and wherein at least one free bond of silicon in each of said (>N—R—Si≡) and said [—(CH₂)ₐSi≡] groups is attached to a group from the class of alkyl and silicon through Si—O bonds and the remaining free bonds of silicon are attached to hydrocarbyl, curing the aminoalkyl silicon compound on the surface of the silver.

21. A process for providing a protective coating for brass which comprises applying to the surface of said brass to form a film thereon an aminoalkyl silicon compound which contains the group:

(>N—R—Si≡)

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH₂)ₐSi≡], wherein (a) is an integer of at least 3 and wherein at least one free bond of silicon in each of said (>N—R—Si≡) and said [—(CH₂)ₐSi≡] groups is attached to a group from the class of alkyl and silicon through Si—O bonds and the remaining free bonds of silicon are attached to hydrocarbyl, heating said film to cure the aminoalkyl silicon compound on the surface of the brass.

22. A process for providing a protective coating on copper which comprises applying to the surface of said copper a solvent solution of gamma-aminopropyltriethoxysilane to form a film thereon, and heating said film to a temperature of at least 150° C. to cure the silane on the copper.

23. A process for providing a protective coating on steel which comprises applying to the surface of said steel a solvent solution of gamma-aminopropylsiloxane to form a film thereon, and heating said film to a temperature of about 150° C. to cure the siloxane on the steel.

24. A metal having a cured surface coating thereon of an aminoalkyl silicon compound containing the following grouping:

(>N—R—Si≡)

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH₂)ₐSi≡], wherein (a) is an integer of at least 3 and wherein at least one free bond of silicon in each of said (>N—R—Si≡) and said [—(CH₂)ₐSi≡] groups is attached to a group from the class of alkyl and silicon through Si—O bonds and the remaining free bonds of silicon are attached to hydrocarbyl.

25. An article having a surface of metal selected from the group consisting of the metals lying below and including magnesium in the electromotive series and alloys thereof, said surface having a cured coating thereon of an aminoalkyl silicon compound containing the following grouping:

$$[H_2N-R-]_d \overset{R''_b}{\underset{|}{Si}} X_{[4-(d+b)]}$$

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from Silicon, R″ represents a hydrocarbon group selected from the class consisting of the alkyl and the aryl groups, X represents an alkoxy group such as methoxy, ethoxy, and propoxy groups, and (b) is an integer having a value of from 0 to 2, (d) is an integer having a value from 1 to 3, and the sum (d+b) is not greater than 3.

26. An article having a surface of metal selected from the group consisting of the metals lying below and including magnesium in the electromotive series and alloys thereof, said surface having a cured coating thereon of an aminoalkyl silicon compound containing the following grouping:

$$\left[ H_2N-R-\overset{R''_b}{\underset{|}{Si}}O_{\frac{3-b}{2}} \right]$$

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, R″ represents a hydrocarbon group selected from the class consisting of the alkyl and the aryl groups and (b) is an integer having a value of from 0 to 2.

27. An article having a surface of metal selected from the group consisting of the metals lying below and including magnesium in the electromotive series and alloys thereof, said surface having a cured coating thereon of an organopolysiloxane containing amino groups attached to silicon through a carbon linkage of at least three carbons, the remainder of the groups attached to silicon being selected from the group consisting of methyl, ethyl, propyl, butyl, phenyl, naphthyl, tolyl, vinyl and cyclohexenyl and curing said organopolysiloxane on said surface to form an adherent coating thereon.

28. An article having a surface of metal selected from the group consisting of the metals lying below and including magnesium in the electromotive series and alloys thereof, said surface having a cured coating thereon of a polymeric aminoalkylpolysiloxane containing the structural units:

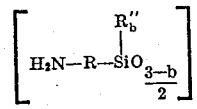

wherein R is a member selected from the group consisting of the divalent saturated aliphatic hydrocarbon, the saturated cyclic hydrocarbon and the unsaturated cyclic hydrocarbon radicals having a chain of at least 3 carbons and wherein nitrogen is attached to at least a third carbon removed from silicon, R'' represents a hydrocarbon group selected from the class consisting of the alkyl and the aryl groups and (b) is an integer having a value of from 0 to 2; and

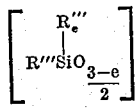

wherein R''' represents a hydrocarbon group selected from the class consisting of methyl, ethyl, propyl, butyl, phenyl, naphthyl, tolyl, vinyl and cyclohexenyl, and (e) is an integer having a value of from 0 to 2.

29. An article having a surface of metal selected from the group consisting of the metals lying below and including magnesium in the electromotive series and alloys thereof, said surface being modified by having a coating of an aminoalkyl silicon compound which is attached thereto through the reaction product of the amino group with the metal surface, said aminoalkyl silicon compound having the grouping:

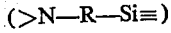

wherein R is a member selected from the group consisting of the divalent saturated aliphatic hydrocarbons, the saturated cyclic hydrocarbon and the unsaturated cyclic hydrocarbon radicals having a chain of at least 3 carbons and wherein nitrogen is attached to at least a third carbon removed from silicon, wherein each of the free bonds of the nitrogen atom is bonded to a member from the class consisting of hydrogen, hydrocarbyl, cyanoalkyl, aminoalkyl and [—(CH$_2$)$_a$Si≡], wherein (a) is an integer of at least 3, and wherein at least one free bond of silicon in each of said (>N—R—Si≡) and said [—(CH$_2$)$_a$Si≡] groups is attached to a group from the class of alkyl and silicon through Si—O bonds and the remaining free bonds of silicon are attached to hydrocarbyl.

30. An article as defined in claim 29 wherein said coating has a thickness of from 0.01 to 0.10 mil.

31. An article having a surface of copper, said copper having a coating of gamma-aminopropyltriethoxysilane cured thereon.

32. An article having a surface of copper, said copper having a coating of gamma-aminopropylsilicone cured thereon.

33. As a coating for metal selected from the class consisting of the metals lying below and including magnesium in the electromotive series, a copolymeric aminoalkylsiloxane composed of the following structural units:

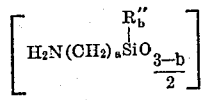

wherein R'' represents a member selected from the group consisting of the alkyl and the aryl groups, (a) is an integer having a value of at least 3, and (b) is an integer having a value of from 0 to 2; and

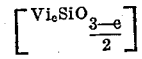

wherein (e) is an integer having a value of from 0 to 2.

34. A copolymeric aminoalkylpolysiloxane composed of the following structural units:

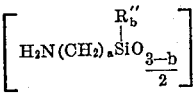

wherein R'' represents a member selected from the group consisting of the alkyl and the aryl groups, (a) is an integer having a value of from 3 to 4, and (b) is an integer having a value of from 0 to 2; and

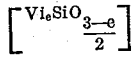

wherein (e) is an integer having a value of from 0 to 2.

35. The method of obtaining a tarnish resistant coating on a metal normally tarnishable by ambient conditions comprising coating the metal with a solution of an aminoalkyl alkoxysilane having the formula

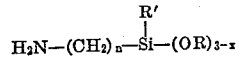

where R is an alkyl group containing from 1 to 10 carbon atoms R' is omitted when x is 0 and when present is an alkyl group containing from 1 to 10 carbon atoms and n is an integer selected from the group consisting of 3 and 4, in an organic solvent and curing the silane.

36. The method of obtaining a tarnish resistant coating on a metal normally tarnishable by ambient conditions comprising coating the metal with a solution of an aminoalkylalkoxysilane having the formula:

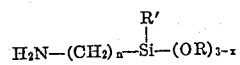

where R is an alkyl group containing from 1 to 10 carbon atoms, R' is omitted when x is 0 and when present is from the group consisting of —(CH$_2$)$_n$NH$_2$ and an alkyl group containing from 1 to 10 carbon atoms, x has a value selected from the group consisting of 0 and 1 and n is an integer selected from the group consisting of 3 and 4, in an organic solvent and curing the silane.

References Cited in the file of this patent

UNITED STATES PATENTS

| | | |
|---|---|---|
| 2,709,569 | Roush | May 31, 1955 |
| 2,762,823 | Speier | Sept. 11, 1956 |
| 2,832,754 | Jex et al. | Apr. 29, 1958 |
| 2,855,381 | Sommer | Oct. 7, 1958 |